United States Patent [19]
Hansford

[11] 3,754,247
[45] Aug. 21, 1973

[54] BERTHING DISPLAY APPARATUS
[75] Inventor: Reginald Frederick Hansford, London, England
[73] Assignee: Decca Limited, London, England
[22] Filed: Apr. 1, 1971
[21] Appl. No.: 130,282

[52] U.S. Cl.............. 343/5 R, 73/178, 340/3 C, 340/29, 340/51, 343/112 PT
[51] Int. Cl............................................. G01s 7/04
[58] Field of Search.............. 343/5 EM, 112 PT, 343/5 R; 73/181, 178 R; 340/3 C, 2 S, 366 CA, 51

[56] References Cited
UNITED STATES PATENTS
3,188,631  6/1965   Birtley .................................. 343/9
3,690,767  9/1972   Missio et al......................... 343/9 X
  836,724 11/1906   Whittle et al....................... 340/29
3,277,430 10/1966   Hagemann et al. ........... 73/178 R X
3,123,824  3/1964   Sherertz....................... 343/5 EM X
2,991,445  7/1961   Haynes et al. .................... 343/5 EM
2,701,352  2/1955   Kingdon et al...................... 340/3 C
2,470,912  5/1949   Best et al. ......................... 340/3 C FOREIGN PATENTS OR APPLICATIONS
607,474    8/1960   Italy...................................... 340/29

Primary Examiner—Malcolm F. Hubler
Attorney—Mawhinney & Mawhinney

[57] ABSTRACT

A display apparatus which produces a display of a ship, a line representing an intended berth and indicators whose separation from the berth marker line represents the deviation of the closing rate of an associated part of the ship from a value determined by a function generator which generates an optimum function from signals representing the distance of the part of the ship from the berth.

7 Claims, 4 Drawing Figures

BERTHING DISPLAY APPARATUS

This invention relates to berthing displays which can be used on a marine craft in order to assist in the berthing of the craft alongside a pier, jetty, wharf or other berth.

One of the principal problems in berthing a marine craft, particularly a large vessel, consists in determining the correct variation in the rate of approach as the vessel approaches its berth. Only a very slight speed at impact, if the vessel is large enough, is needed to cause considerable damage to a jetty or wharf. However, it is frequently necessary to manoeuvre a vessel at a relatively much greater speed immediately before it makes its final approach to the berth and a correct estimation of the rate at which the speed should be reduced is very difficult.

Although it has previously been proposed to provide numerical indicators showing the sideways velocity of the vessel at the bow and stern and the longitudinal velocity of the vessel, multiple sets of numbers are difficult to interpret accurately and quickly. Accordingly the present invention is concerned with an improved form of berthing display to assist in controlling the berthing of a vessel.

The present invention rests on an appreciation that for any vessel there will be at least one parameter, associated with the movement of the vessel, which should vary in a desired manner as the vessel approaches its berth. Thus for sideways movement towards a berth, for any given vessel, there is a predeterminable optimum function relating, for example, the required closing rate to the distance away from the berth. Such a function can be determined empirically but for the purpose of illustration it will be assumed that the velocity should be proportional to distance. If the actual closing rate differs from the predetermined rate, namely the desired value of the parameter for a given distance of part of the vessel from the berth, then propulsion must be applied or altered to correct the actual closing rate.

However, it is not necessary for the parameter to be velocity. For example it could be the speed of laterally thrusting propellers.

According to the invention, a display apparatus comprises a display device, means for indicating an intended berth of the vessel as a linear marker, means for indicating the vessel, means for controlling the relative positions of the indications of the vessel and the linear marker in conformity with the relative positions of the vessel and the berth, means for displaying a marker which is movable relative to the linear marker, means for producing a signal representing a parameter which varies as the vessel approaches its berth, a function generator for producing a signal representing the desired value of the parameter in accord with a predetermined function of the distance of part of the vessel from the berth, and means for causing the separation of the marker and the marker line to represent the difference between the actual value and the desired value of the parameter.

According to the invention the marker is controlled automatically in accordance with the measured distance off from the berth and the measured parameter in such a manner that if at any time the variable parameter, such as closing rate, is correct, the marker will touch or be superimposed on the linear berth marker. If the closing rate exceeds the predetermined value associated with the measured distance from the berth, then the marker would be disposed on the opposite side of the linear marker whereas if the closing rate is less than the predetermined rate for the given distance from the berth, the marker will be on the same side of the linear marker as the vessel's indicator. Accordingly the marker will give an immediate picture of the correctness of the parameter such as closing rate and it can immediately be seen from the display what action must be taken to cause the vessel to approach the berth in the required manner.

It is possible to use a single marker which is movable in the direction of the middle part of the vessel but in general it would be preferable to provide a marker for the bow and the stern of the vessel and to provide for movement of the two markers to an fro either at a right angle to the berth marker line or at a right angle to the fore-and-aft line of the indicated vessel.

In order to operate apparatus according to the invention, it is necessary to provide inputs constituted by signals representing the distance of the vessel or a part thereof from the berth, the orientation of the vessel with respect to the berth and the value of the parameter whose variation as the vessel approaches its berth must be monitored and corrected. However, apparatus such as radar for giving indications of position or velocity and compasses for giving indications of azimuth are well known and can readily be used to provide the necessary signals for operating the display.

Reference hereinafter will be made to the accompanying drawings in which.

Figure 1:
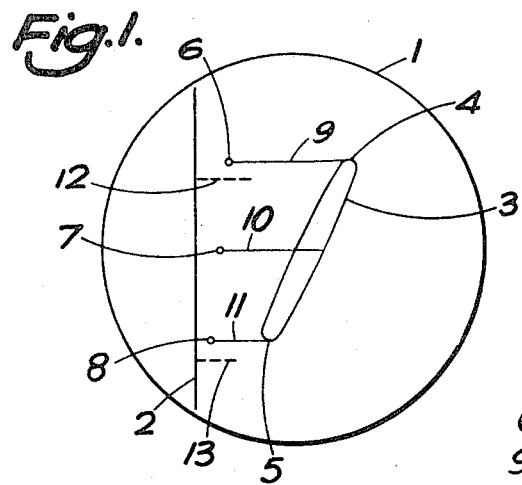
FIG. 1 illustrates a display produced in accord with the invention.

FIG. 1 illustrates a display of a vessel, its intended berth and various markers in accord with the invention. A linear marker 2 hereinafter called "berth marker," will be displayed on the display 1 as normally a vertical line and will be in the left or right-hand half of the display according as the vessel is berthing with her port or starboard side to the berth. The display may be formed on the display screen of a cathode ray tube 20 (FIG. 2) which has X deflection circuits 21 and Y deflection circuits 22. It will be understood that the tube 20 and the associated circuits 21 and 22 are of a well-known type capable of producing a display that includes a plurality of marker lines and other indications. Accordingly the berth marker line 2 may be developed in response to a simple waveform, either sinusoidal or sawtooth, applied from a generator 23 to the Y deflection circuits 22 of the cathode ray tube 20. The berth marker line 2 may be positioned laterally on the display 1 by feeding to the X deflection circuits 21 either one of two alternative fixed bias signals from a positioning control 24.

If any fixed horizontal marker line is required it can be produced by applying a repetitive deflection waveform to the X deflection circuits and an appropriate bias signal to the Y deflection circuits.

Also on the display 1 is produced an indication of the vessel. The vessel is conveniently represented as a narrow ellipse 3 although more complicated and accurate shapes may be displayed if desired. The top of the ellipse 3 representing the vessel may represent the bow of the vessel and the bottom 5 of the ellipse can represent the stern of the vessel. Such an ellipse can be produced on the display by the simultaneous application to the X and Y deflection circuits of two sinusoidal waveforms of the same frequency. One of the waveforms can be applied to the Y deflection system so as to produce a vertical deflection of, for example, 10 centimetres in length, and the second signal, which would be in phase quadrature with the first signal, can be applied to the X deflection circuits so as to produce a horizontal deflection of for example, 1 centimetre.

Figure 2:
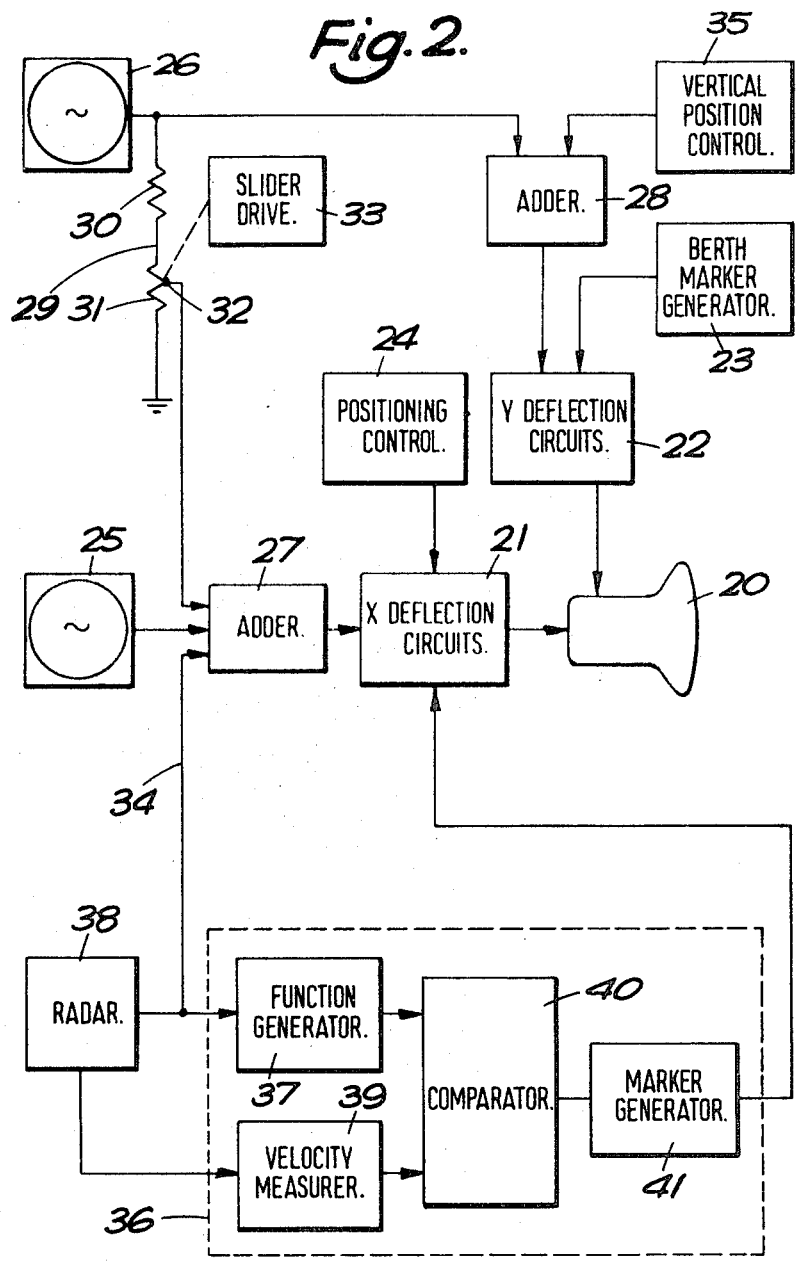
FIG. 2 is a schematic diagram of apparatus, for producing a display of the kind shown in FIG. 1.

In FIG. 2 there are shown two sinusoidal signal sources 25 and 26 respectively producing sinusoidal waveforms of, for example, 10 KHz, the sinusoidal waveforms being applied through respective adders 27 and 28 to the X deflection circuits 21 and the Y deflection circuits 22 respectively.

In general the vessel will not be exactly parallel to the berth and it is necessary to represent the vessel as a slightly tilted ellipse. A small, adjustable portion of the sinusoidal signal applied to the Y deflection plates can be combined with the sinusoidal signal applied to the X deflection plates. For this purpose the output from the source 26 is applied across a potentiometer 29 comprising a fixed resistor 30 and a variable resistor 31 of which the slider 32 is connected to one input of the adder 27 which combines the required proportion of the sinusoidal output from the source 26 with the sinusoidal output from the source 25. The slider of the potentiometer 32 may be driven by a drive 33 which may be manually operated or automatically operated in accordance with the known heading of the ship, as obtained from a compass, and the azimuth of a line along the berth.

If the additional X deflection waveform obtained from the potentiometer 29 has an amplitude equal to K times the deflection waveform where K is a small positive fraction, then the ellipse will be turned through an angle $\theta$ where tan $\theta$ is approximately equal to K. The ellipse will be tilted in one direction or the other according as the further X deflection waveform is added to or subtracted from the original X deflection waveform obtained from the source 25. If it is never necessary to consider angles of misalignment between the vessel and the berth of more than for example 30° then it would be advantageous to arrange the potentiometer so that it reaches the limit of its range of adjustment when such a maximum angle of misalignment is reached. The fixed resistor 30 can then be chosen to ensure that the angle $\theta$ of inclination of the ellipse to the marker line 2 is always approximately equal to the angle of misalignment ($\alpha$) of the vessel. Alternatively, the resistor 30 may be of some other value so that $\theta$ is always greater than $\alpha$ but always proportion thereto, thereby making the display apparently more sensitive.

The ellipse 3 must be displaced horizontally from the berth marker line in conformity with and in proportion to the vessel's actual lateral displacement from the berth. The displacement of the ellipse may be provided by the addition of a signal, representing this distance, over a line 34 to the adder 27.

It is unlikely that the vessel will be at all times exactly opposite her intended final position at the berth and accordingly it is appropriate to allow some vertical adjustment of the position of the ellipse on the display. The position of the ellipse may be vertically altered by means of an additional bias signal from a vertical position control 35. The signal from the control 35 would be combined with the other Y deflection signals in the adder 28 and thence applied to the Y deflection circuits 22.

It will be seen that the display device requires inputs representing the position of some part of the vessel from the berth and the position of the vessel in the direction along the berth. In general the obtaining of these signals is a simple matter using well-known apparatus. For example, the distance of the vessel from the berth may be measured by primary or secondary radar. The position of the vessel may be determined as a range and bearing from the radar or by computation from measured radar ranges to two fixed points. If the distance to two fixed points on the berth is measured from two points in the vessel, for example, the bow and stern of the vessel, the measured distances can be used to determine the orientation of the vessel with respect to the berth. Alternatively the orientation of the vessel may be determined using a compass and knowing the compass direction of the berth. Measurement of the speed of the vessel, particularly a closing rate towards the berth, may be determined from the distance measuring apparatus by for example differentiation of a signal indicating distance from the berth. Distance information using two measured distances may readily be processed in simple computers to provide signals representing speed components in any required direction.

Another way of obtaining the necessary inputs for a computer would be to use a phase comparison radio position fixing system to determine the position of the vessel.

In the display shown in FIG. 1 it is desired to indicate the variation from the value given by a predetermined function of a parameter which varies as the berth is approached. For convenience the parameter chosen is closing rate, namely the rate at which a respective part of the vessel approaches its final position adjacent the berth. The rate is regarded as having direction perpendicular to the berth. In the present embodiment three such markers, 6, 7 and 8 associated with the bow, center and stern of the vessel are provided. In practice, the markers 6, 7 and 8 are formed at the ends of respective lines 9, 10 and 11 which are directed so as to pass through the respective parts, namely the bow, center and stern of the ship and in parallel directions all perpendicular to the berth marker line 2. It is however only the ends of these lines which are of importance and as will be appreciated later, the lines themselves may be wholly or partly omitted and the markers 6, 7 and 8 can be produced as small circle markers.

In the present embodiment the variable parameter is the rate at which the respective part of the ship, for example the bow 4, approaches the berth. The distance of the marker 6 from the berth marker line depends on the difference between the actual closing rate and the intended closing rate. The desired closing rate varies as a function of distance of the respective part of the vessel from the berth. It is readily possible to generate, by means of well-known digital computing circuits or special purpose analogue computing circuits, a function which varies in a predetermined manner. In FIG. 2 is shown one such circuit. The bow marker control circuit 36 includes a function generator 37 which receives a signal representing the distance of, for example, the bow of the vessel from the berth. This signal can as previously mentioned readily be obtained from a radar 38. Also obtainable from the radar 38 or from the distance signal is a signal representing the closing rate of the bow. The circuits or digital computing function adapted to provide such a signal is represented as a velocity measurer 39. At any time it is desired that the closing velocity should conform to a predetermined value which depends on the distance of the bow from the berth. The desired value is obtained from the function generator 37. In the present embodiment the function generator generates an output proportional to the distance signal. It may however provide, in general, a function H(s) where s is the distance signal. The desired and actual values of the closing rate may be compared in a simple voltage comparator 40 or similar device in order to obtain an error signal which will determine the separation of the marker 6 from the line 2. This error signal is fed to a marker generator 41 which in known manner will feed appropriate deflection signals to the X deflection system 21 of the cathode ray tube 20.

The distance between the marker 6 and the line 2 may be directly proportional to the error in the closing rate. Alternatively some non-linear relationship between the distance and the error in the closing rate may be adopted. This non-linear relationship may be the same throughout the whole berthing operation but it is possible to change the relationship gradually and automatically as the vessel nears the berth, for example to make the display more sensitive during the final stages of berthing. It will be understood that in any case the scale to which the closing rate error is represented need not be specifically related to the scale by which the berth and the vessel's marker are represented. However in the presently-described embodiment the function generator produces simply a signal which decreases linearly as the separation between bow and berth decreases and the comparator produces a very simple output, namely a voltage or current directly proportional to the error in the closing rate.

The error signal is, by means of the marker generator and the deflection circuits, put into position as a point marker, preferably a very small circle, constituting the marker 6 in FIG. 1. Although the position of this marker relative to the line 2 tells an observer all that the observer needs to know about the closing rate of the respective part of the ship, it may be desirable to link the marker to the respective part of the ship by an electronic line. Thus in the case of the marker 6 it is preferable to produce by means of the marker generator 41 another electronic marker line 9. This marker line can be produced in response to a sawtooth waveform giving a horizontal deflection from the point 6 rightwards. This line can conveniently extend across the full width of the display but can be blacked out as it crosses the ellipse 3. The suppression of the marker line can readily be initiated by a trigger circuit which operates when the sawtooth waveform controlling the marker line passes through a value corresponding to the horizontal coordinate of the respective part of the ellipse 3.

Circuits equivalent to the bow marker control circuit 36 would be provided for the center and stern closing rate markers 7 and 8 and auxiliary marker lines, 10 and 11 for the markers 7 and 8 can be produced in the same way as is the line 9. It will be understood that the way in which the markers can be visually linked to the ellipse is capable of great variation. As has been mentioned it is only necessary that the markers 6, 7 and 8 themselves are displayed.

It is unlikely that the vessel will at all times during a berthing operation be exactly opposite the precise part of the berth where it will ultimately come to rest. There are two possibilities for the vertical positioning of the markers 6, 7 and 8 on the display. They can be positioned so that they are always at the same height on the display as the parts of the ellipse 3 with which they are associated or they can be vertically positioned at the intended final positions of the respective parts of the vessel.

This embodiment of the invention has been described in terms of using the closing rate as the parameter that varies according to the separation of a part of the vessel and the berth. However, there are other significant parameters that the pilot may wish to monitor. Some ships are fitted with means for laterally propelling the bow and stern. These means may take the form of auxiliary propellers or chains or cables connected to the jetty. In this case control of the ship may be exercised by controlling the thrust or tension in these lateral propulsion means in accord with the distance of the respective part of the ship from the jetty. In this case the input to the circuits 36 can be obtained from appropriate sensors monitoring the parameter, such as engine speed, thrust or tension as the case may be; in other respects the circuits will function exactly as described. The significance of the position of the markers will be interpreted in a similar manner.

It may assist the pilot to see on the display markers indicating the intended final position of the ellipse along the jetty. Such a position can be indicated by a fixed marker line 12 at right angles to the berth marker line and passing through the intended final position of the top of the ellipse. A similar line 13, instead of or in addition to the foregoing line, can be displayed as passing through the intended final position of the bottom of the ellipse. In certain situations it may be necessary for the vessel to approach the berth obliquely and in such circumstances it would clearly be advantageous for the lines 12 and 13 to be oblique to the berth marker. It would be appropriate to give these lines 12 and 13 a distinctive appearance, distinguishing them from the lines 9, 10 and 11 extending from the ellipse to the markers 6, 7 and 8. The distinction in appearance may be provided by forming one set of markers as continuous lines and the other set of markers as broken or dotted lines. Techniques for displaying fixed marker lines, continuous or broken, in preset positions are well known.

Figure 3:
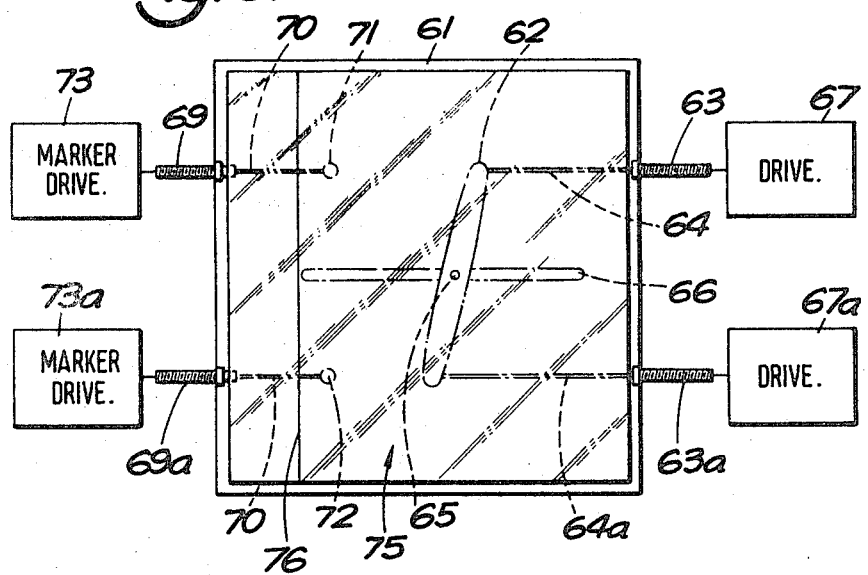
FIG. 3 is a schematic representation of an alternative form of display apparatus which can be used in place of part of the embodiment of FIG. 2.

FIG. 3 illustrates an alternative embodiment of the display device forming part of the apparatus of FIG. 2. The display device of FIG. 3 could replace the cathode ray tube and its associated circuits.

The embodiment of FIG. 3 could be used where a cathode ray tube could not conveniently be accommodated.

In FIG. 3, the display is formed by a base board 61 which may be mounted vertically. Movable over the base board is a solid ellipse 62 cut from metal or plastics sheet. The inclination and horizontal positioning of the ellipse 62 are determined by two 63a screws 63, 63 attached to the ends of the ellipse 62 by rods 64, 64a.

Vertical movement of the ellipse is prevented by a pin 65 engaging horizontal slots 66 in the base board. The lead screws 63 are driven by drives 67 and 67a which need inputs defining the changes of position of the bow and stern of the ship relative to its berth. As has been explained with reference to the embodiment described in FIG. 2, these signals are easy to obtain by well-known means.

At the opposite side of the board 61, two additional lead screws 69, 69a are capable of moving rods 70, 70a to and fro in a horizontal direction. Attached to these rods are two small but conspicuous discs 71 and 72. These discs correspond to the markers 6 and 8 described with reference to FIG. 2. The rods 70, 70a would pass beneath the ellipse but would not affect the movement thereof.

Each of the rods 70, 70a is driven by a respective marker drive (73 or 73a) each corresponding to the circuit 36, without the generator 41, described with reference to FIG. 2.

It is preferable to make the base board black and the rods black also and to make the ellipse white in order to obtain the best possible visual appearance of the display.

The base board has a glass cover 75 with a bold vertical line 76 marked on it to represent the berth.

In this embodiment the markers 71 and 72 are driven in an exactly analogous manner to the way in which the markers 6 and 8 are positioned on the cathode ray display tube.

Figure 4:
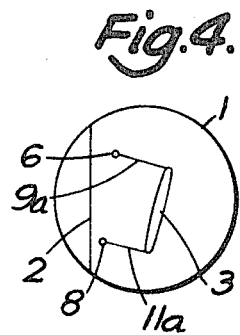
FIG. 4 illustrates a modified form of the display of FIG. 1.

There are several ways in which the embodiments described above may be modified. The marker lines extending to the markers 6, 7 and 8 need not be at right angles to the berth marker 2 but may be at right angles to the major axis of the ellipse 3. FIG. 4 illustrates part of the display of FIG. 1, in which the lines 9 and 11 are replaced by lines 9a and 11a at right angles to the vessel α indicated by the ellipse 3. The separation of the markers (6 and 8) from the berth marker 2 can be controlled by controlling the end of such marker lines 9a and 11a, so that the distance from (for example) the marker line 2 to the marker 6 is controlled along a line 9a which is oblique to the berth marker. However, this control is also a control of the shortest distance of the marker 6 and the berth marker 2.

The lines 9, 10 and 11 are produced in the described embodiment inter alia by the application of deflection signals to the X deflection circuits. A proportion of such deflection signals may be simultaneously applied to the Y deflection circuits to cause the marker lines to be at right angles to the major axis of the ellipse 3. The proportion is simply related to the setting of the potentiometer which determines the slope of the said major axis.

The various marker lines need not be continuous but can be represented as lines of dots.

The computation of the separation of the indicators from the berth marker and, indeed, the formulation of the complete display could readily be performed by an appropriately programmed digital computer. In such an event at least the marker lines would be represented by a series of dots.

I claim:

1. Display apparatus comprising a display device, means for indicating an intended berth of a vessel as a linear marker, means for indicating the vessel, means for controlling the relative positions of the indications of the vessel and the linear marker in conformity with the relative positions of the vessel and the berth, means for displaying a marker which is movable relative to the linear marker, means for producing a signal representing a parameter which varies as the vessel approaches its berth, a function generator for producing a signal representing the desired value of the parameter in accord with a predetermined function of the distance of part of the vessel from the berth and means for causing the separation of the marker and the marker line to represent the error between the actual value and the desired value of the parameter.

2. Display apparatus according to claim 1 in which the display device comprises a base board over which a representation of the vessel is movable by means of lead screws.

3. Display apparatus according to claim 1 wherein the parameter is velocity.

4. Display apparatus according to claim 1 wherein the vessel is represented as an elongate ellipse.

5. Display apparatus according to claim 1 in which the marker is a small circular marker.

6. Display apparatus according to claim 1 in which the marker is movable to and fro in the direction of the indication of the said part of the vessel.

7. A display apparatus according to claim 6 in which a respective marker as aforesaid is provided in respect of the bow and the stern of the vessel.

* * * * *